United States Patent [19]

Kita et al.

[11] Patent Number: 5,437,944
[45] Date of Patent: Aug. 1, 1995

[54] ORGANIC ELECTROLYTIC SOLUTION CELL

[75] Inventors: Fusaji Kita; Akira Kawakami, both of Osaka, Japan

[73] Assignee: Hitachi Maxell, Ltd., Osaka, Japan

[21] Appl. No.: 829,061

[22] PCT Filed: Jun. 12, 1991

[86] PCT No.: PCT/JP91/00787

§ 371 Date: Feb. 10, 1992

§ 102(e) Date: Feb. 10, 1992

[87] PCT Pub. No.: WO91/20104

PCT Pub. Date: Dec. 26, 1991

[30] Foreign Application Priority Data

Jun. 12, 1990 [JP] Japan ............................ 2-153082
Aug. 17, 1990 [JP] Japan ............................ 2-217963

[51] Int. Cl.$^6$ ............................................. H01M 10/40
[52] U.S. Cl. ............................................. 429/195; 429/197; 429/198
[58] Field of Search ................ 429/194, 195, 197, 198

[56] References Cited

U.S. PATENT DOCUMENTS 4,074,028 2/1978 Will ................................... 429/198 X
5,128,222 7/1992 Yoshizawa et al. ............. 429/198 X

FOREIGN PATENT DOCUMENTS 1174274 9/1984 Canada ............................. 429/198
59-108276 6/1984 Japan .............................. 429/198
8803331 5/1988 WIPO .

OTHER PUBLICATIONS

Dey, *J. Electrochemical Soc.: Electrochemical Science* "Electrochemical Studies on the Effect of Water in Nonaqueous Electrolytes" p. 823; Aug. 1967.

*Primary Examiner*—Stephen Kalafut
*Attorney, Agent, or Firm*—Birch, Stewart, Kolasch & Birch

[57] ABSTRACT

A thermally stable organic electrolytic solution cell which has a positive electrode, a negative electrode having an alkali metal or an compound of an alkali metal, and an electrolytic solution having an organic solvent and an electrolyte, wherein the electrolytic solution contains a dissolved organic metal salt in which a fluoroalkyl group having at least 4 carbon atoms and an anionic group are covalently bonded, and to the anionic group, an alkali metal ion or an alkaline earth metal ion is ionically bonded.

12 Claims, 1 Drawing Sheet

ORGANIC ELECTROLYTIC SOLUTION CELL

This application is a national phase application of PCT application no. PCT/JP91/00787, filed in Japan on Jun. 12, 1991, published as WO 91/20104.

BACKGROUND OF THE INVENTION

1. Field of the Invention

The present invention relates to an organic electrolytic solution cell, and more particularly, it relates to an improvement of the organic electrolytic solution of such cell.

2. Description of the Related Art

The organic electrolytic solution cell, such as a lithium-manganese-dioxide cell which comprises a lithium negative electrode, a manganese dioxide positive electrode and an organic electrolytic solution, has increasingly come into wide use, because of its high energy density, light weight and long-life.

As an electrolyte for the organic electrolytic solution cell, $LiClO_4$ is commonly used. (See, for example, T. Iwamaru, O. Kajii, Practical Lithium Batteries, p53 (1988).

A cylindrical lithium-manganese dioxide cell has also increasingly come into wide use as a battery of a camera. Combinations of the electrolytic solution such as a cyclic ether and the electrolyte have been studied in order to provide excellent characteristics even at a low temperature.

Consideration as to safety is important for a big size cell such as the cylindrical lithium-manganese dioxide cell, because it is dangerous if a fire or a detonation occurs by any chance.

Generally, this type of the cell is provided with the PTC device a resistance of which increases to decrease the intensity of an electric current when a temperature of the cell rises abnormally by an electric current or heat or a safety valve device, which exhausts the inner gas in the cell through a vent hole to prevent explosion of the cell under high pressure, when an inner pressure of the cell is increased abnormally by generation of gas in the cell. However, the cell may be fired after continuation of the overdischarge under a large electric current without the PTC device.

For example, the cylindrical lithium-manganese dioxide cell comprising $LiClO_4$ as the electrolyte, as shown in FIG. 1, which has an outer diameter of 15 mm and a height of 40 mm, abnormally generates heat when it is overdischarged at 4 A and discharged at a constant voltage of −3 V after reaching −3 V, and sometime causes the fire or the detonation.

To improve the thermal stability of the cell, it is proposed to use $LiCF_3SO_3$ as an electrolyte. Though the cell using $LiCF_3SO_3$ is stable under the normal condition, it generates abnormal heat when the discharge electric current exceeds 15 A.

Therefore the use of $LiCF_3SO_3$ which effects to the safety only in the overdischarge is still insufficient.

SUMMARY OF THE INVENTION

An object of the present invention is to provide an organic electrolytic solution cell which does not generate an abnormal heat during the overdischarge to maintain cell safety.

To achieve the above object, abnormal heat generation of the cell during overdischarge is prevented by using an organic metal salt in which a fluoroalkyl group having at least 4 carbon atoms and an anionic group are covalently bonded; and to the anionic group, an alkali metal ion or an alkaline earth metal ion is ionically bonded.

Herein, the anionic group is a substituent group such as $-SO_3-$ and $-CO_2-$, which is able to bond with an alkali metal ion or the alkaline earth metal ion.

The reason why the abnormal heat generation of the cell during the overdischarge is prevented by using the above electrolyte may be as follows.

When a large electric current flows in the cell and a temperature of the cell increases rapidly and reaches around the melting point of the separator, the separator is clogged and the current will not flow normally.

When the electric current is extremely large and the separator is rapidly clogged, the clogging is irregularly formed. Then, dendritic growth of the alkali metal, such as lithium, appears in the irregularly clogged area when the cell voltage is reversed during the overdischarge so that a short circuit is formed. In that case the cell generates an abnormal amount of heat so that danger of fire or detonation increases.

In accordance with the present invention, it may be hypothesized that the use of the electrolyte of the present invention can prevent generation of the abnormal heat of the cell because of the prevention of the large electric current in the cell by the effect of an absorption of the fluoroalkyl group to the negative electrode and an interaction between the fluoroalkyl groups and the alkali metal ion, such as $Li^+$ ion, in the electrolytic solution.

When the electrolyte of the present invention is used, the separator is clogged an overdischarge of −3 V and the electric current gradually decreases after a short time. On the other hand when $LiCF_3SO_3$ is used as the electrolyte, the electric current does not always monotonously decreased but sometimes increases on the way. These phenomena predict that the electrolyte of the present invention influences the morphology of alkali metal electrodeposition to the positive electrode and the difference in the morphologies of alkali metal electrodeposition onto the positive electrode may be one of the factors which prevents the generation of the abnormal heat.

DETAILED DISCUSSION

As an element of the ion which bonds with the anionic group in the electrolyte, are exemplified alkali metals such as Li (lithium), Na (sodium) and K (potassium) or alkaline earth metals such as Ca (calcium), Mg (magnesium) and Be (beryllium). The most suitable element is Li (lithium), because a lithium or a compound of lithium is usually used as the negative electrode. During the overdischarge, $MCF_3SO_3$ (e.g. $LiCF_3SO_3$) having one carbon atom is more effective for improving the safety than $LiClO_4$, but, under the large electric current at overdischarge of −3 V, the cell sometime generates the abnormal heat, the fire and detonation. The fluoroalkyl group having at least 4 carbon atoms is effective in improving the safety of the cell and seldom generates the abnormal heat leading to fire and detonation. In view of improving the safety of the cell, the number of carbon atoms is preferred to be large, preferably from 4 to 10. If the number of the carbon atoms is more than 10, ionic conductivity is decreased and therefore the characteristics such as discharge characteristic is deteriorated. The fluoroalkyl group may contain a hydrogen atom, but by taking stability of the electrolyte in the cell into account, the most preferable fluoroalkyl group is a perfluoroalkyl group.

Selection of the electrolytic solution is important to obtain the cell having an excellent discharge characteristic, since the ionic conductivity is decreased by increasing the number of the carbon atoms in the fluoroalkyl group. For example, it is reported that the ionic conductivity of a solution of $Li_2C_2F_4(SO_3)_2$ in a concentration of 0.6 mol/l in tetrahydrofuran is 0.45 $mS.cm^{-1}$, while the ionic conductivity of a solution of $Li_2C_4F_8(SO_3)_2$ in tetrahydrofuran is only 0.0043 $mS.cm^{-1}$ since it is dissolved in a concentration of 0.001 mol/l (V. R. Koch, et al, J. Power Sources, 20,287 (1987)). As understood from the result of the above literature it is clear that the solubility of the electrolyte and the ionic conductivity are decreased by increasing the number of the carbon atoms. Therefore, in case of using the electrolyte having the fluoroalkyl group containing at least four carbon atoms, to obtain a cell having excellent discharge characteristics, it is more important to select the proper solvent, than in the case of using $LiCF_3SO_3$ which contains the fluoroalkyl group having one carbon atom.

It has been determined that the use of a mixed solvent of an ester and an ether, especially an ester and a linear ether, is very effective in providing a cell having the excellent discharge characteristic, because the mixed solvent is capable of suitably dissolving the electrolyte. For example, contrary to general belief, a mixed solvent of propylene carbonate and 1,2-dimethoxyethane in a volume ratio of 1:2 is capable of dissolving at least 5 mole/l of $LiC_4F_9SO_3$, even though the number of carbon atoms in the fluoroalkyl group is 4.

In the present invention, as a solvent of the electrolytic solutions, the ester is used for preventing a reaction between an active material for positive electrode such as manganese dioxide and the ether to improve storage stability. Examples of the ester are propylene carbonate, butylene carbonate, γ-butyrolactone, γ-valerolactone, etc. Among them, propylene carbonate is preferred. The content of the ester in the solvent of the electrolytic solution is preferably at least 10% by volume to maintain the storage stability by preventing the reaction between the active material for positive electrode and the ether.

Examples of the ether are 1,2-dimethoxyethane, dimethoxymethane, dimethoxypropane, 1,3-dioxolane, tetrahydrofuran, 4-methyl-1,3-dioxolane, and 2-methyltetrahydrofuran, etc. Among them, linear ethers such as 1,2-dimethoxyethane, dimethoxymethane and dimethoxypropane are preferred, because these ethers have a good effect on discharge characteristics at low temperature. To obtain the cell having an excellent discharge characteristic, the content of the ether in the solvent of the electrolytic solution is preferably at least 50% by volume, more preferably at least 60% by volume. To attach greater importance to characteristics at low temperature, the mixed solvent is preferably a combination of propylene carbonate and 1,2-dimethoxyethane. In particular, the content of 1,2-dimethoxyethane in the combination is preferably from 55 to 80% by volume, more preferably from 60 to 75% by volume.

To obtain the cell having an excellent discharge characteristics, the selection of solvent is quite effective, because it can improve solubility of the electrolyte and ionic conductivity. In this case, the content of the electrolyte in the electrolytic solution is preferably form 0.1 to 2.0 mol/l, more preferably from 0.2 to 0.7 mol/l.

When the content of electrolyte is less than above range, an intermittent discharge characteristic of the cell is deteriorated. When the content is more khan above range, a viscosity of the solution increases so that the intermittent discharge characteristic is deteriorated.

The fluoroalkyl group in the electrolytic solution described above may be not only the linear type but the cyclic type. As described above, the number of the carbon atoms is preferably at most 10, because the ionic conductivity is decreased with the increase of the number of the carbon atoms, therefore if the number of carbon atoms is too large, it become difficult to increase the ionic conductivity even though the solvent is properly selected.

As explained above, it is possible to improve the safety of the cell during overdischarge by using the electrolyte of the present invention in the cell and achieve substantially the same discharge characteristic as the cell using $LiClO_4$ or $LiCF_3SO_3$.

To obtain the cell which has excellent discharge characteristics, it is necessary to use the solvent for the electrolytic solution in which the electrolyte of the present invention has large solubility. However in the case of the cell using this kind of solvent, the internal resistance of the cell tends to increase due to a reaction between the alkali metal as the positive electrode and the electrolyte solution when the cell is left or stored after partial discharge.

During the development of the present invention to prevent the increase of internal resistance when the cell is left or stored after the partial discharge, it is found that when the cell is left or stored after the partial discharge, the increase of internal resistance can be prevented by adding at least one compound selected from the group consisting of ethylene carbonate, glymes such as methyldiglyme [$CH_3(OCH_2CH_2)_2OCH_3$], methyltriglyme [$CH_3(OCH_2CH_2)_3OCH_3$], and methyltetraglyme [$CH_3(OCH_2CH_2)_4OCH_3$], a $BF_4^-$ containing salt, $BF_3$, a $SbF_6^-$ containing salt and $SbF_5$.

Ethylene carbonate and the glymes described above can be used as the solvent for the electrolytic solution. The reason why these solvents can prevent the increase of the internal resistance of the cell when the cell is left or stored after the partial discharge may be as follows.

Ethylene carbonate and the glymes have an effect to decrease basicity (or increase acidity) of the electrolytic solution at an interface between the alkali metal as the negative electrode and the electrolytic solution, consequently a reactivity between the solvent of the electrolytic solution and the alkali metal as the negative electrode is decreased.

An amount of ethylene carbonate or the glyme is preferably from 1/15 to ⅓ by volume, more preferably from 1/10 to 1/5 of the ether volume. When the amount of the ethylene carbonate or the glyme is less than 1/15 of the ether volume, it is difficult to prevent the increase of the internal resistance when the cell is left or stored after the partial discharge. When the amount of the ethylene carbonate or the glyme is more than ⅓ of the ether volume, the characteristics at low temperature are deteriorated.

The $BF_4^-$ containing salt includes $LiBF_4$, $(C_2H_5)_4NBF_4$, etc., and the $SbF_6^-$ containing salt includes $LiSbF_6$, $(C_2H_5)_4NSbF_6$, etc. Both can be used as an electrolyte. Because these are all Lewis acids and can decrease Lewis basicity, the $BF_4^-$ or $SbF_6^-$ containing salt, $BF_3$ and $SbF_5$ can prevent the increase of internal resistance when the cell is left or stored after partial discharge.

An amount of the $BF_4^-$ or $SbF_6^-$ containing salt, $BF_3$ or $SbF_5$ is preferably from $5 \times 10^{-4}$ to $2 \times 10^{-2}$ mole per one mole of ether, more preferably from $3 \times 10^{-3}$ to $6 \times 10^{-3}$ moles. When the amount of the $BF_4^-$ or $SbF_6^-$ containing salt, $BF_3$ or $SbF_5$ is less than $5 \times 10^{-4}$ mole per one mole of the ether, it is difficult to prevent the increase of the internal resistance when the cell is left or stored after partial discharge. When its amount is more than $2 \times 10^{-2}$ mole, the storage stability of the undischarged cell is deteriorated.

Since the electrolytic solution of the present invention contains the electrolyte having the above structure for the safety of the cell, this type of electrolyte sometimes corrodes a metal part of a current collecter provided at the positive electrode. Such corrosion can be prevented to some extent by using austenitic stainless steel or titanium as a metal part of the current collecter. However, the addition of water to the electrolytic solution is effective for preventing the corrosion of the metal provided at the positive electrode, and the content of water in the electrolytic solution is preferably at least 50 ppm, more preferably at least 200 ppm. Water restrains the corrosive action of fluorine against the metal. However when the content of the water is more than 1000 ppm, water will react with the negative electrode.

Because the ionic conductivity of the electrolytic solution containing the electrolyte of the present invention is somewhat low, when it is necessary to generate a large current, the separator is made as thin as possible, preferably at most 50 μm, more preferably at most 30 μm.

PREFERRED EMBODIMENTS

EXAMPLES

Figure 1:
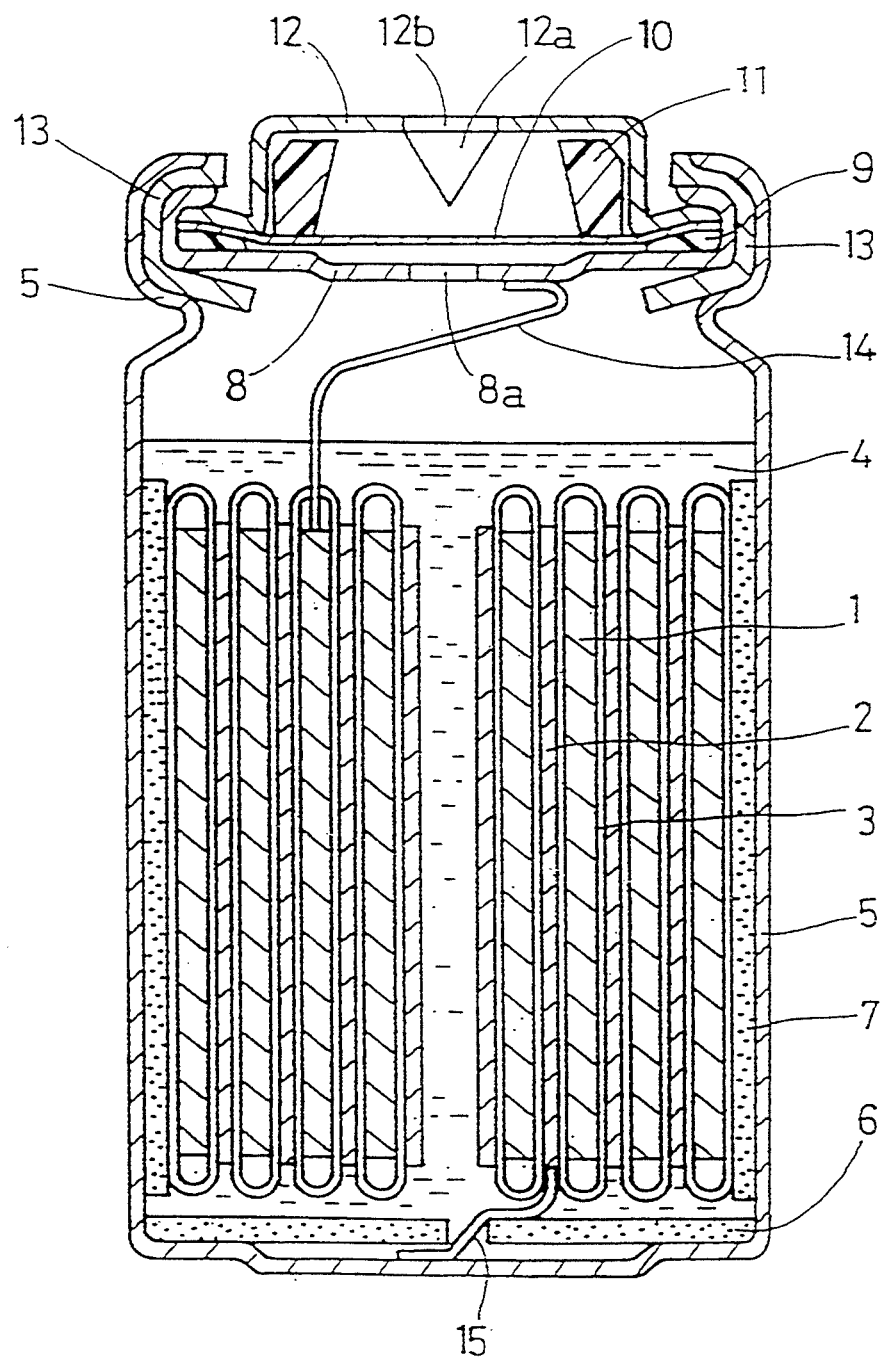
FIG. 1 is a cross sectional view of one embodiment of the organic electrolytic solution cell of the present invention.

The present invention will be explained further in detail by the following Examples.

Example 1

A band shape positive electrode plate, which comprises a current collector and a sheet of the manganese dioxide mixture (a thickness of 0.4 mm and a width of 30 mm) comprising a stainless steal mesh as a core and manganese dioxide, carbon black and polytetrafluoroethylene which had been heat treated at 450° C., was dried at 250° C. for 9 hours, then cooled down to room temperature in dry air.

The band shape positive electrode plate was wrapped with a separator made of a microporous polypropylene film having a thickness of 25 μm, laminated with a band shape negative electrode plate made of lithium and wound in the form of a spindle. Then, the wound electrodes were installed in a stainless steel cell case having an outer diameter of 15 mm and a lead member was attached by spot welding.

Separately, an electrolytic solution was prepared by dissolving 0.6 mole/litter of $LiC_4F_9SO_3$ in a mixed solvent of propylene carbonate (PC) and 1,2-dimethoxyethane (DME) in a volume ratio of 1:2 (0.6MLiC$_4$F$_9$SO$_3$/PC:DME(1:2)). The solution contained 23 ppm of water when measured by the Karl Fischer's method.

Then the electrolytic solution was poured in the cell case which contained the electrodes.

The opening of the cell case was closed by the conventional method, and the cell was stabilized and aged to obtain a cylindrical organic electrolytic solution cell having the structure shown in FIG. 1.

Concerning the cell shown in FIG. 1, there is seen a positive electrode 1 made of the manganese dioxide mixture mentioned above, which comprises the stainless steel mesh as the core material a negative electrode 2 made of lithium, which is bonded to the stainless steel mesh by pressure welding. The stainless steel mesh and the current collecter which are used for producing the positive electrode 1 and negative electrode 2 are not shown in FIG. 1 for simplicity. A separator 3 and electrolytic solution 4 are provided.

A stainless steel cell case 5 acts as a negative terminal. In the bottom of the cell case 5, an insulation plate 6 made of a polytetrafluoroethylene sheet is arranged, and in the inside, an insulation plate 7 made of a polytetrafluoroethylene sheet, is arranged. The wound electrode consisting of the positive electrode 1, the negative electrode 2 and the separator 3, and the electrolytic solution 4 are accommodated in the cell case 5.

A sealing plate 8 is made of stainless steel having, at a central portion, a gas venthole 8a. A is a ring-form packing 9 is made of polypropylene and a flexible thin film or plate 10 is made of titanium. A ring-form thermal deformable member 11 is made of polypropylene, which has an action of altering destructive pressure of the flexible thin plate 10 deforming by deforming with temperature. A terminal plate 12 is made of a nickel-plated iron plate which is formed by rolling. The terminal plate 12 is provided with a cut blade 12a and a gas vent hole 12b. When internal pressure of the cell is increased by generation of gas in the cell, the flexible thin plate 10 is deformed by high pressure and is destroyed by the cut blade 12a to exhaust the inner gas in the cell through the gas vent hole 12b. An insulation packing 13 is provided. A lead member 14 electrically connects the positive electrode 1 and the sealing plate 8, and the terminal plate 12 acts as the positive electrode terminal by its connection with the sealing plate 8. A lead member 15 electrically connects the negative electrode plate 2 and the cell case 5.

Example 2

In the same manner as in Example 1 except that an electrolytic solution was prepared by dissolving 0.6 mole/litter of $LiC_4F_9SO_3$ in a mixed solvent of propylene carbonate (PC), 1,2-dimethoxyethane (DME) and ethylene carbonate (EC) in a volume ratio of 3:6:1 (0.6MLiC$_4$F$_9$SO/PC:DME:EC(3:6:1)), the cylindrical organic electrolytic solution cell was produced.

Example 3

In the same manner as in Example 1 except that an electrolytic solution was prepared by dissolving 0.6 mole/litter of $LiC_4F_9SiO_3$ in a mixed solvent of propylene carbonate (PC), 1,2-dimethoxyethane (DME) and methyldiglyme (MDG) in a volume ratio of 3:8:1 (0.6MLiC$_4$FSO$_3$/PC:DME:MDG (3:8:1)), the cylindrical organic electrolytic solution cell was produced.

Example 4

In the same manner as in Example 1 except that an electrolytic solution was prepared by dissolving 0.6 mole/litter of $LiC_4F_9SO_3$ and 0.03 mole/litter of $LiBF_4$ in a mixed solvent of propylene carbonate (PC) and 1,2-dimethoxyethane (DME) in a volume ratio of 1:2 (0.6MLiC$_4$F$_9$SO$_3$+0.03MLiBF$_4$/PC:DME (1:2)), the cylindrical organic electrolytic solution cell was produced.

Example 5

In the same manner as in Example 1 except that an electrolytic solution was prepared by dissolving 0.6 mole/litter of $LiC_4F_9SO_3$ and 0.03 mole/litter of $LiSbF_6$ in a mixed solvent of propylene carbonate (PC) and 1,2-dimethoxyethane (DME) in a volume ratio of 1:2 (0.6$MLiC_4F_9SO_3$+0.03$MLiSbF_6$/PC:DME (1:2)), the cylindrical organic electrolytic solution cell was produced.

Example 6

In the same manner as in Example 1 except that an electrolytic solution was prepared by dissolving 0.6 mole/litter of $LiC_4F_9SO_3$ and 0.03 mole/litter of $LiBF_4$ in a mixed solvent of propylene carbonate (PC), 1,2-dimethoxyethane (DME) and ethylene carbonate (EC) in a volume ratio of 3:8:1 (0.6$MLiC_4F_9SO_3$+0.03-$MLiBF_4$/PC:DME:EC (3:8:1)), the cylindrical organic electrolytic solution cell was produced.

Example 7

In the same manner as in Example 1 except that the content of water in the electrolytic solution was adjusted to 200 ppm by adding water, the cylindrical organic electrolytic solution :cell was produced.

Comparative Example 1

In the same manner as in Example 1 but using $LiClO_4$ as an electrolyte in place of $LiC_4F_9SO_3$, the cylindrical organic electrolytic solution cell was produced.

Comparative Example 2

In the same manner as in Example 1 but using $LiCF_3SO_3$ as a electrolyte in place of $LiC_4F_9SO_3$, the cylindrical organic electrolytic solution cell was produced.

Each of the cells produced in Examples 1 to 6 and Comparative Examples 1 and 2 was discharged at a constant current of 5 amperes, and after the cell voltage was reversed to −3 volts, discharged at a constant voltage of −3 volts.

The number of the cells which generated heat at least 150° C. on the surface or which was damaged was counted. The results are shown in Table 1. Five cells of the each Example or Comparative Example were subjected to the test. In Table 1, numerator is the number of generated heat at least 150° C. on the surface (abnormal heat) or damaged cell and denominator is the number of the tested cell.

TABLE 1

|  | Ratio of heated or damaged cell |
| --- | --- |
| Example 1. | 0/5 |
| Example 2. | 0/5 |
| Example 3. | 0/5 |
| Example 4. | 0/5 |
| Example 5. | 0/5 |
| Example 6. | 0/5 |
| Comparative Example 1. | 5/5 |
| Comparative Example 2. | 0/5 |

As understood from the results of Table 1, Examples 1 to 6 of the present invention did not generate the abnormal heat or damage, namely the addition of $LiC_4F_9SO_3$ is effective to the safety of the cell during overdischarge. On the other hand, all the cells in the Comparative Example 1 using $LiClO_4$ as the electrolyte generated abnormal heat or were damaged. Therefore, they are not safe during the overdischarge. However, the results of Table 1 indicate the cells in Comparative Example 2 using $LiCF_3SO_3$ as the electrolyte are safer than the cells in Comparative Example 1 under the overdischarge condition mentioned above.

In order to estimate the safety of the cell under more severe condition, each of the cells produced in Examples 1 to 6 and Comparative Examples 1 and 2 was overdischarged at a constant voltage of −3 volts and maximum current of 15 amperes. The number of the cells which generated heat at least 150° C. on the surface or damaged was counted. The results are shown in Table 2. Five cells of the each Example or Comparative Example were subjected to the test. The results in Table 2 are indicated in the same manner as in Table 1.

TABLE 2

|  | Ratio of heated or damaged cell |
| --- | --- |
| Example 1. | 0/5 |
| Example 2. | 0/5 |
| Example 3. | 0/5 |
| Example 4. | 0/5 |
| Example 5. | 0/5 |
| Example 6. | 0/5 |
| Comparative Example 1. | 5/5 |
| Comparative Example 2. | 3/5 |

As understood from the results of Table 2, the cell of Examples 1 to 6 of the present invention did not generate abnormal heat or damage, namely they are safe even under the severe condition of overdischarge. On the other hand, many of the cells in Comparative Examples 1 and 2 generated abnormal heat or damaged. The cells in Comparative Example 2 using $LiCF_3SO_3$ as the electrolyte had insufficient safety under the severe condition such as unlimited current in overdischarge.

In order to estimate a degree of the deterioration of the discharge characteristic of the cell using $LiC_4F_9SO_3$ as the electrolyte, the cells of Examples 1 to 6 and Comparative Examples 1 and 2 were subjected to an intermittent discharge test at 20° C. and measured the number of discharging until the discharge voltage fell to 1.3 volts.

The condition of one intermittent discharging was discharging at 1.2 A for 3 seconds and stopping for 7 seconds. The results are shown in Table 3.

TABLE 3

|  | the number of intermittent discharging of the cell |
| --- | --- |
| Example 1. | 1152 times |
| Example 2. | 1162 |
| Example 3. | 1140 |
| Example 4. | 1155 |
| Example 5. | 1148 |
| Example 6. | 1173 |
| Comparative Example 1. | 1155 |
| Comparative Example 2. | 1145 |

As understood from the results of Table 3, the number of intermittent discharging of the cell of Examples 1 to 6 were substantially the same as those in Comparative Examples 1 to 2, namely the deterioration of discharge characteristic of the cell caused by the use of $LiC_4F_9SO_3$ was not observed.

The cells of Examples 1 to 6 were subjected to the intermittent discharge test which applied 880 cycles at 20° C. The condition of one intermittent discharging was discharging at 1.2 A for 3 seconds and stopping for V seconds. The cells were measured in terms of the internal resistance at 1 KHz after 4 hours from the applied intermittent discharge and the internal resistance at 1 KHz after being stored at 60° C. for 3 days and cooled down to the room temperature by LCR meter (4262A manufactured by Yokogawa Hewlett Packard). The results are shown in Table 4.

TABLE 4

|  | Internal resistance($\Omega$) | |
| --- | --- | --- |
|  | Original | After 3 days at 60° C. |
| Example 1. | 0.4 | 1.2 |
| Example 2. | 0.4 | 0.7 |
| Example 3. | 0.4 | 0.8 |
| Example 4. | 0.4 | 0.6 |
| Example 5. | 0.4 | 0.5 |
| Example 6. | 0.4 | 0.5 |

As understood from the results of Table 4, the internal resistance after being stored at 60° C. for 3 days in Examples 2 to 6 was low. The result indicated that the increase of the internal resistance during the storage after the partial discharge was restrained by the addition of ethylene carbonate (Example 2), methyldiglyme (Example 3), LiBF$_4$ (Example 4), LiSbF$_6$ (Example 5), or ethylene carbonate and LiBF$_4$ (Example 6) to the electrolytic solution.

10 ml of the electrolyte solution used in Example 1 was charged in a vial. In the vial, a center part piece of the positive electrode used in Example 1 was added. The vial was closed tightly and stored at 80° C. for 6 days. The same experiment was carried out with the materials used in Example 7.

The result showed that the charge collector made of stainless steal in the electrolytic solution of Example 7 was not corroded and any metal element of the active material for the positive electrode and the charge collecting was hardly detected by analysis.

As understood from the results, because any elution of metal elements from the positive electrode could be prevented by the addition of water to the electrolyte solution, the present,invention prevents precipitation of metal elements of positive electrode on the surface of lithium and their growth which causes the internal short circuit, and prevents deterioration of an open circuit voltage of the cell.

Accordingly, the organic electrolytic solution cell of the present invention does not generate abnormal heat and is safe under an overdischarge.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An organic electrolytic solution cell which comprises a positive electrode, a negative electrode comprising an alkali metal or a compound of an alkali metal, and an electrolytic solution comprising an organic solvent and an electrolyte, said electrolyte comprising a compound of the formula:

$$M(C_nF_{2n+1}SO_3)_x$$

wherein M is an alkali metal or an alkaline earth metal, n is an integer of at least 4, and x is 1 when M is the alkali metal and x is 2 when M is the alkaline earth metal.

2. An organic electrolytic solution cell which comprises a positive electrode, a negative electrode comprising an alkali metal or a compound of an alkali metal and an electrolytic solution comprising an organic solvent and an electrolyte, said electrolytic solution containing a dissolved organic metal salt in which a fluoroalkyl group having at least four carbon atoms and an anionic group are covalently bonded and, to said anionic group, an alkali metal ion or an alkaline earth metal ion is ionically bonded, wherein said organic solvent comprises a mixture of an ester and an ether, content of said ester and said ether in said organic solvent being at least 10% and at least 55% by volume, respectively, wherein said ester is selected from at least one member of the group consisting of propylene carbonate and ethylene carbonate and said electrolytic solution further contains at least one member of the group consisting of a BF$_4$ containing salt or BF$_3$ and a SbF$_6$-containing salt or SbF$_5$.

3. An organic electrolytic solution cell according to claim 2, wherein said ether is 1,2-dimethoxyethane.

4. An organic electrolytic solution cell which comprises a positive electrode, a negative electrode comprising an alkali metal or a compound of an alkali metal, and an electrolytic solution comprisinq an organic solvent and an electrolyte, said electrolytic solution containing a dissolved organic metal salt in which a fluoroalkyl group having at least four carbon atoms and an anionic group are covalently bonded and, to said anionic group, an alkali metal ion or an alkaline earth metal ion is ionically bonded, wherein said organic solvent for said electrolytic solution contains an ether in an amount of at least 55% by volume and ethylene carbonate, and said electrolytic solution further contains a BF$_4$-containing salt or BF$_3$.

5. An organic electrolytic solution cell which comprises a positive electrode, a negative electrode comprising an alkali metal or a compound of an alkali metal, and an electrolytic solution comprising an organic solvent and an electrolyte, said electrolytic solution containing a dissolved organic metal salt in which a fluoroalkyl group having at least four carbon atoms and an anionic group are covalently bonded and, to said anionic group, an alkali metal ion or an alkaline earth metal ion is ionically bonded, wherein said organic solvent for said electrolytic solution contains an ether in an amount of at least 55% by volume and ethylene carbonate, and said electrolytic solution contains a SbF$_6$-containing salt or SbF$_5$.

6. An organic electrolytic solution cell which comprises a positive electrode, a negative electrode comprising an alkali metal or a compound of an alkali metal, and an electrolytic solution comprising an organic solvent and an electrolyte, said electrolytic solution containing a dissolved organic metal salt in which a fluoroalkyl group having at least four carbon atoms and an anionic group are covalently bonded and, to said anionic group, an alkali metal ion or an alkaline earth metal ion is ionically bonded, wherein said organic solvent for said electrolytic solution contains an ether in an amount of at least 55% by volume and propylene carbonate, and said electrolytic solution further contains a $BF_4$-containing salt or $BF_3$.

7. An organic electrolytic solution cell which comprises a positive electrode, a negative electrode comprising an alkali metal or a compound of an alkali metal, and an electrolytic solution comprising an organic solvent and an electrolyte, said electrolytic solution containing a dissolved organic metal salt in which a fluoroalkyl group having at least 4 carbon atoms and an anionic group selected from the group consisting of $-SO_3$ and $-CO_2$ are covalently bonded and, to said anionic group, an alkali metal ion or an alkaline earth metal ion is ionically bonded.

8. An organic electrolytic solution which contains an electrolyte dissolved in an organic solvent, said electrolyte comprising an organic metal salt in which a fluoroalkyl group having at least four carbon atoms and an anionic group are covalently bonded and to said anionic group, an alkali metal ion or an alkaline earth metal ion is ionically bonded, wherein said organic solvent comprises a mixture of an ester and an ether, content of said ester and ether in said organic solvent being at least 10% and at least 55% by volume, respectively, said ester being selected from at least one member of the group consisting of ethylene carbonate and propylene carbonate and said electrolytic $BF_4$-containing salt or $BF_3$ and $SbF_6$-containing salt or $SbF_5$.

9. The organic electrolytic solution of claim 8, wherein said ether is 1,2-dimethoxyethane.

10. The organic electrolytic solution of claim 8, wherein said organic solvent for said electrolytic solution contains a maximum of 1000 ppm of water.

11. An organic electrolytic solution comprising an organic solvent and an electrolyte, said electrolytic solution containing a dissolved organic metal salt in which a fluoroalkyl group having at least four carbon atoms and an anionic group are covalently bonded and, to said anionic group, an alkali metal ion or an alkaline earth metal ion is ionically bonded, wherein said organic solvent for said electrolytic solution contains an ether in an amount of at least 55% by volume and ethylene carbonate, and said electrolytic solution further contains a $BF_4$-containing salt or $BF_3$.

12. An organic electrolytic solution comprising an organic solvent and an electrolyte, said electrolytic solution containing a dissolved organic metal salt in which a fluoroalkyl group having at least four carbon atoms and an anionic group are covalently bonded and, to said anionic group, an alkali metal ion or an alkaline earth metal ion is ionically bonded, wherein said organic solvent for said electrolytic solution contains an ether in an amount of at least 55% by volume and propylene carbonate, and said electrolytic solution contains a $SbF_6$-containing salt or $SbF_5$.

* * * * *